United States Patent
Lindholm et al.

(10) Patent No.: US 8,180,878 B2
(45) Date of Patent: May 15, 2012

(54) METHODS AND APPARATUSES FOR TERMINATING AN IP MULTIMEDIA SUBSYSTEM SERVICE WHEN IP ADDRESS IS NO LONGER ALLOCATED TO THE USER

(75) Inventors: Fredrik Lindholm, Älvsjö (SE); David Castellanos, Madrid (ES); John Michael Walker, Den Haag (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 12/518,022

(22) PCT Filed: Dec. 8, 2006
(Under 37 CFR 1.47)

(86) PCT No.: PCT/EP2006/069469
§ 371 (c)(1),
(2), (4) Date: Nov. 11, 2010

(87) PCT Pub. No.: WO2008/067853
PCT Pub. Date: Jun. 12, 2008

(65) Prior Publication Data
US 2011/0119357 A1    May 19, 2011

(51) Int. Cl.
*G06F 15/173* (2006.01)
(52) U.S. Cl. ......... 709/223; 709/220; 370/338; 370/231
(58) Field of Classification Search .................. 709/220, 709/223; 370/338, 231
See application file for complete search history.

(56) References Cited

U.S. PATENT DOCUMENTS
| | | | |
|---|---|---|---|
| 2006/0120287 A1* | 6/2006 | Foti et al. | 370/231 |
| 2007/0192846 A1* | 8/2007 | Thai et al. | 726/12 |
| 2007/0281704 A1* | 12/2007 | Lin et al. | 455/445 |

OTHER PUBLICATIONS

Ericsson. IMS implications for notification of loss of signaling bearer; S2-063541. 3GPP TSG-SA WG2 Meeting #55, [Online] Oct. 23-27, 2006 pp. 1-6, XP002451853 Retrieved from the Internet: URL:http://www.3gpp.org/ftp/tsg sa/WG2-Arch/TSGS2_55_Busan/Docs/S2 063541.zip> [retrieved on Sep. 20, 2007] paragraph [5.4.7.5.] paragraph [5.10.3.0.] paragraph [E. 2.1A. 2.].

Ericsson. Conclusion to Loss of signaling bearer P-CSCF behaviour; S2-063965. 3GPP TSG-SA WG2 Meeting #55, [Online] Oct. 23, 2006-Oct. 27, 2006 pp. 1-2, XP002451854 Retrieved from the Internet: URL:http://www.3gpp.org/ftp/tsg_sa/WG2_Arch/TSGS2_ 55_ Busan/Docs/S206396S.zip> [retrieved on Sep. 20, 2007] paragraph [7.3.2.].

Etsi Tispan. Telecommunications and Internet converged Services and Protocols for Advanced Networking (TISPAN); NGN Functional Architecture; Network Attachment Sub-System (NASS), E1SI ES 282 004. ETSI Standards, European Telecommunications Standards Institute, Sophia-Antipo, FR, vol. TISPAN, No. VIII, Jun. 2006, pp. 1-34, XP014037128 ISSN: 0000-0001 paragraph [5.4.1.3.].

* cited by examiner

*Primary Examiner* — Kyung H Shin

(57) ABSTRACT

A method and network node for terminating an IP Multimedia Subsystem (IMS)-enabled communication service involving a user terminal, which has been allocated an IP address by an access network used by the terminal to access the communication service. Upon determining that the IP address is no longer allocated to the user by the access network, the node terminates the IMS communication service.

5 Claims, 4 Drawing Sheets

METHODS AND APPARATUSES FOR TERMINATING AN IP MULTIMEDIA SUBSYSTEM SERVICE WHEN IP ADDRESS IS NO LONGER ALLOCATED TO THE USER

TECHNICAL FIELD

The invention relates to the field of session management and access control management in a communications network.

BACKGROUND

IP Multimedia (IPMM) is an example of a service that provides a dynamic combination of voice, video, messaging, data, etc, within the same session. By growing the numbers of basic applications and the media that it is possible to combine, the number of services offered to the end users will grow, and the inter-personal communication experience will be enriched. This will lead to a new generation of personalised, rich multimedia communication services, e.g. peer-to-peer multimedia communication, IPTV etc.

These services can be based on the IP Multimedia Subsystem (IMS) architecture, which is the technology defined by the Third Generation Partnership Project (3GPP) to provide IP Multimedia services over mobile communication networks (3GPP TS 22.228, TS 23.228, TS 24.229, TS 29.228, TS 29.229, TS 29.328 and TS 29.329 Releases 5 to 7).

The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session. FIG. 1 illustrates schematically how the IMS fits into the mobile network architecture in the case of a 3GPP PS access domain.

IMS networks can be accessed using access networks, typically wireless access networks but also fixed line access networks. Referring to FIG. 2A, when a user wishes to access a network using a terminal (shown as terminal 1 in FIG. 2A) connected to a fixed line, the user may first be authenticated in an access network using Network Attachment Sub-System (NASS) (ETSI TS 282 004 v1.1.1). A Connectivity Session Location and Repository Functions (CLF) is a NASS entity that allocates an IP address to the terminal, and authenticates and authorises the user. The NASS can also be used to configure preferences in the access network, depending on a user profile stored by the NASS. If the user subsequently registers with an IMS network, the IMS network makes use of the IP address allocated to the terminal in order to establish a session between the user and, for example, a peer user or other media source.

Referring to FIG. 2B, a problem arises if the original terminal (shown as terminal 1 in FIG. 2B), for any reason, loses its connection with the access network whilst an IMS session is active. In this case, terminal 1 loses its registration in the access network, without closing down its IMS registration. IP addresses are allocated dynamically by the CLF, and so a subsequent terminal (shown as terminal 2 in FIG. 2B) that connects to the access network may be allocated the same IP address that was allocated to the original terminal. In this case, IP packets relating to an IMS session established by the original terminal will be sent to the subsequent terminal, giving the subsequent terminal unauthorised access to that session.

SUMMARY

According to a first aspect of the invention, there is provided a method of terminating an IP Multimedia Subsystem enabled communication service involving a user terminal, the terminal having been allocated an IP address by an access network used by the terminal to access the communication service, the method comprising:

determining when the IP address is no longer allocated to the user by the access network; and as a consequence of the determination, terminating the IP Multimedia Subsystem communication service.

It is preferred that the determination comprises receiving a message from the access network signalling a change of state of the IP address, and preferably the message is received at a network node, the node being selected from a Call Session Control Function and an http proxy.

The invention may be implements where the access network uses Network Attachment Sub-System.

The method may comprise, on establishing the IP Multimedia Subsystem enabled communication service, sending a subscribe message to the access network, the subscribe message requesting that a notify message is sent when any changes occur to the state of the allocated IP address. This reduces the amount of signalling sent from the access network. It is preferred that the request message is a Diameter subscribe command and the notify message is a Diameter notify message.

The IP Multimedia Subsystem enabled communication service may be terminated on receipt of a message informing the network node that the IP address has been assigned to another user. Alternatively, the IP Multimedia Subsystem enabled communication service is terminated on receipt of a message from a different user having the same IP address. The delay between determining that the IP address is no longer allocated to the user and terminating the communication service allows for the user who has lost connectivity to re-establish connectivity with the same IP address.

According to a second aspect of the invention, there is provided a node for use in a communications access network, the node comprising:

means for allocating an IP address to a terminal;

means for monitoring the state of the IP address;

means for sending a message to a communications network when a change of state is detected.

According to a third aspect of the invention, there is provided a node for use in a communications network, the node comprising:

a receiver for receiving a message relating to a change of state of an IP address of a user;

means for initiating termination of an IP Multimedia Subsystem enabled communication service established with the user.

According to a fourth aspect, there is provided a method of terminating an IP Multimedia Subsystem enabled communication service involving a user terminal, the terminal having been allocated an IP address by an access network used by the terminal to access the communication service, the method comprising:

determining when the IP address is no longer allocated to the user by the access network; and as a consequence of the determination, preventing any further messages from being forwarded to the user terminal.

DETAILED DESCRIPTION

Considering a first scenario when a user accesses an IMS network via an access network using Network Attachment Sub-System (NASS), the Connectivity Session Location and Repository Functions (CLF) assigns an IP address to the user terminal. When a user subsequently registers with an IMS network and initiates an IMS communication service, the allocated IP address is used to route data associated with this service to the user terminal. The Proxy-Call Session Control Function (P-CSCF) in the IMS network sends a message to the CLF to subscribe to changes in the IP address of the user.

Subsequent changes in the IP address are notified to the P-CSCF using existing Sh subscribe/notify Diameter messages. Rather than informing the P-CSCF about changes for all IP addresses and users, the P-CSCF is only informed about relevant changes in the IP address for the user.

Figure 1:
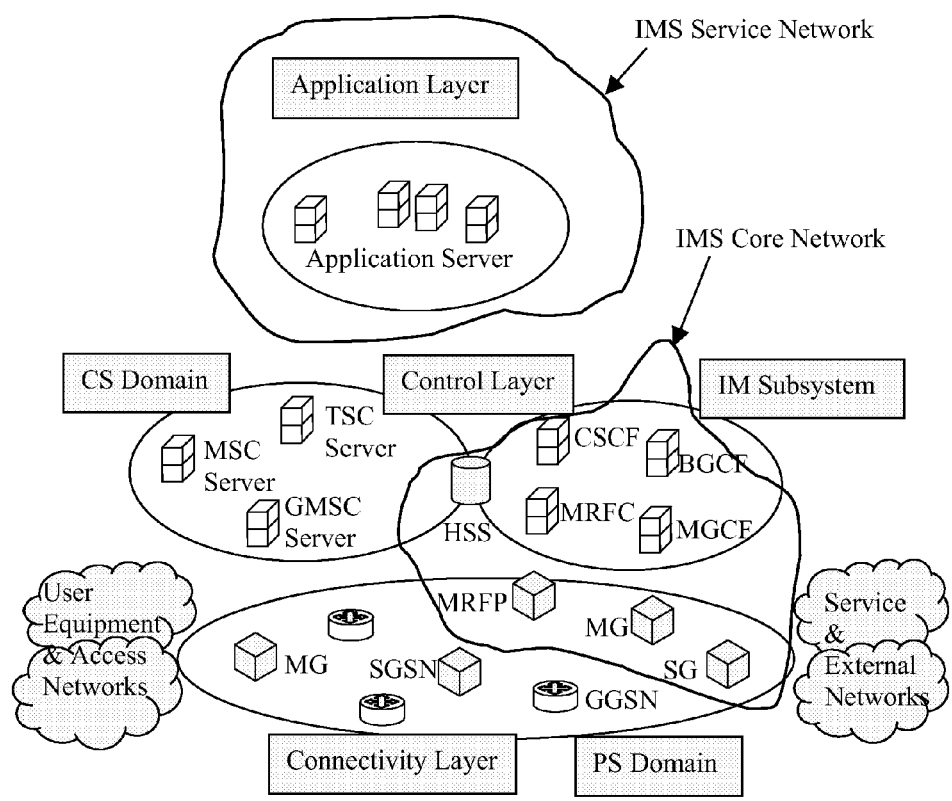
FIG. 1 illustrates schematically how the IMS fits into the mobile network architecture in the case of a 3GPP PS access domain.
Figure 2A:
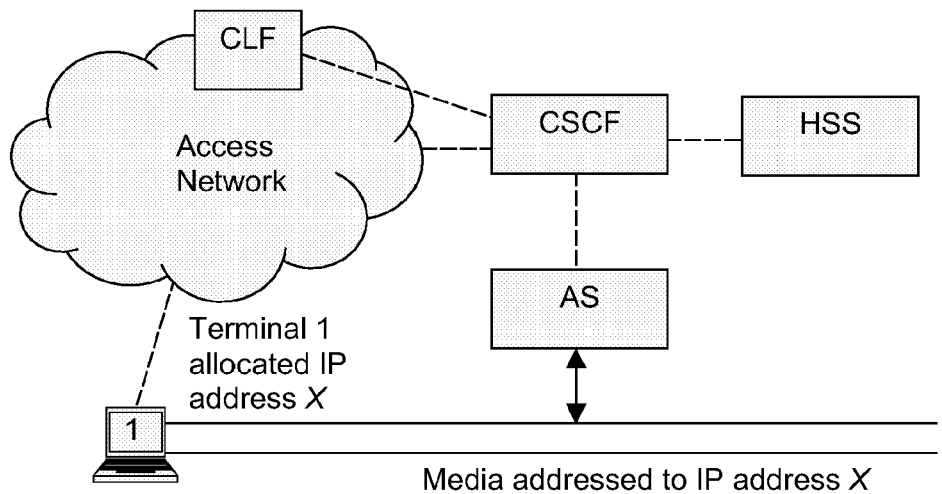
FIG. 2 illustrates schematically a problem that arises from a subsequent terminal being allocated the same IP address as a disconnected terminal.
Figure 2B:
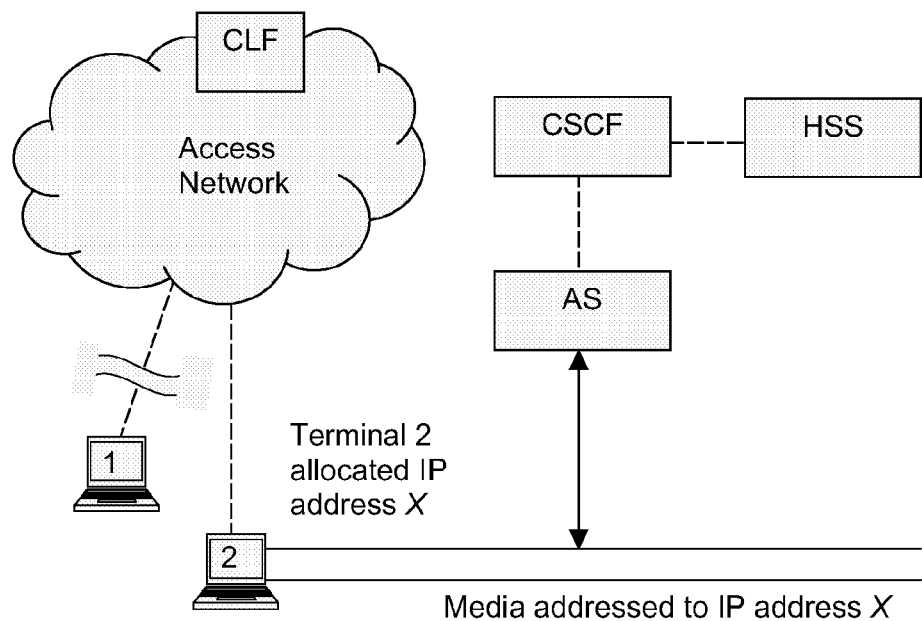
Figure 3:
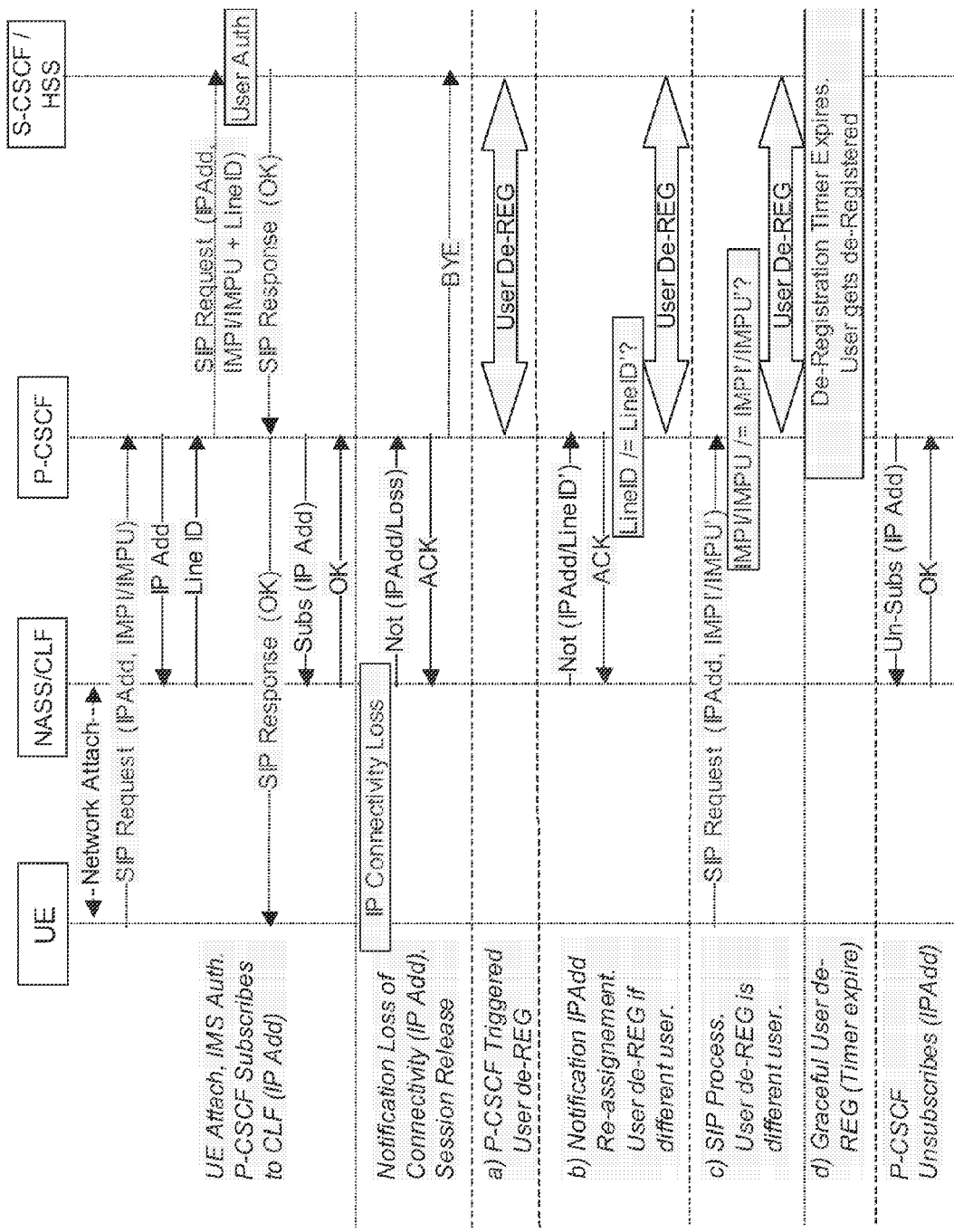
FIG. 3 illustrates schematically the signalling to deregister a session with an IMS network where a terminal loses connectivity.

Referring to FIG. 3, if the terminal loses connectivity then the user becomes de-registered in the access network (NASS). The allocated IP address is therefore free to be allocated to another terminal within the access network. It can be said that the IP address has changed its "state". When the IP address changes its state, the CLF sends a message to the P-CSCF informing the IMS network that the IP address is no longer valid for the user.

In response to this message, the P-CSCF initiates the termination of all ongoing IMS Sessions related to the affected user, and rejects further incoming session requests. Additionally, the P-CSCF may either decide to initiate a network requested user de-registration (shown as step a in FIG. 3) towards the Serving Call Session Control Function (S-CSCF) and Home Subscriber Server (HSS) in the IMS network, or alternatively may decide to maintain the registration status of the user until one of the following scenarios occurs:

1. The CLF informs the P-CSCF that the IP address has been re-assigned to the user (shown as step b in FIG. 3). In this case the P-CSCF checks whether the IP address has been reassigned to a new user or to the original user. In the scenario where the IP address is allocated to a new user, the P-CSCF either instructs the S-CSCF to de-register the original user, or alternatively allows the original user's IMS registration to expire.

2. An originating SIP method is received from the same IP address (shown as step c in FIG. 3). In this case, the P-CSCF checks if the SIP method refers to the original user using the IMPU/IMPI associated with that IP Address before the notification of loss of connectivity. This may require that the P-CSCF performs further CLF queries. If the P-CSCF determines that the IP address has been allocated to a new user, the P-CSCF may either ask the S-CSCF to de-register the original user in the IMS network, or may wait until the original user's registration expires automatically (e.g. the de-registration timer expires).

3. If neither of steps 1 or 2 above occur, the user becomes de-registered in the IMS network because a re-registration timer expires (shown as step d in FIG. 3).

When the P-CSCF successfully de-registers the user from IMS, the P-CSCF also cancels the subscription to be notified of changes in the IP Address status at the CLF. When the user is de-registered from the IMS, the S-CSCF sends messages to all entities that have an active session with the user to instruct those entities to terminate all active sessions. This prevents any further IP packets from being sent to the user.

Figure 4:
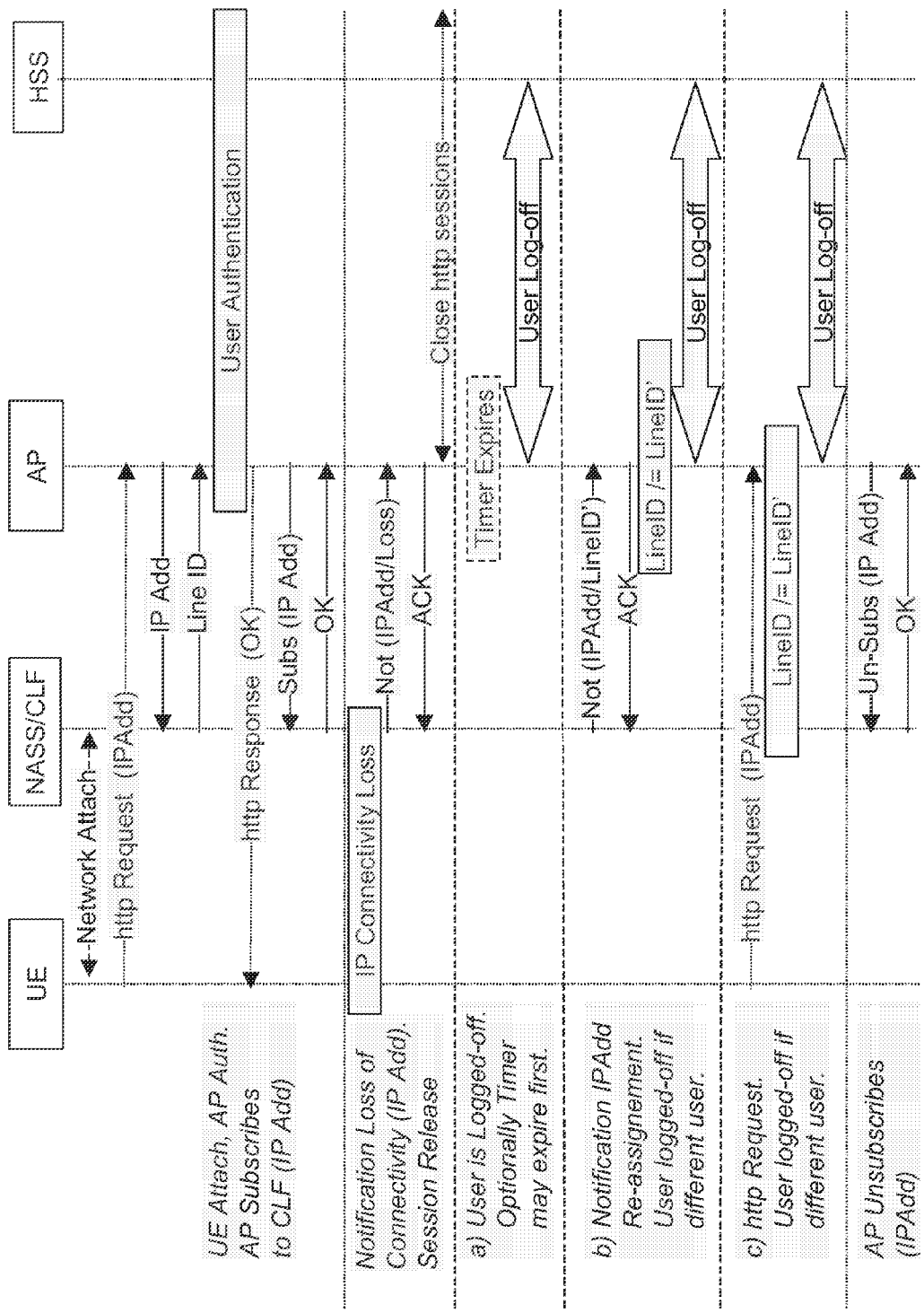
FIG. 4 illustrates schematically the signalling to release a session with an http-proxy where a terminal loses connectivity.

The description above assumes that the P-CSCF subscribes to be notified by the CLF of sate changes in an IP address. However, this may alternatively be done by the S-CSCF Considering now a second scenario, a user connecting to a telecommunication network over a fixed access broadband connection may be provided with an http interface (typically Ut) in addition to a SIP interface. The http interface can be used to initiate communication services without requiring SIP signalling between the terminal and the telecommunication network (typically for self provisioning procedures). In this case, the user accesses the access network via an http proxy (shown as AP in FIG. 4), which provides an interface between the terminal and the telecommunication network. The AP performs the functions of both authenticating the user and authorising the user to access a particular set of Applications. Of course, when a user seeks to access the telecommunication network via an http proxy, the user must first have registered in the access network with the CLF. The CLF will have assigned an IP address to the user terminal. When the user subsequently attempts to access an Application Server or a Service Provider behind the AP via the http interface, the allocated IP address is used to route data sent to the user terminal. As with the first example scenario, in order to reduce unnecessary signalling, when the user is authorised and authenticated at the AP, AP subscribes to changes in the state of the IP address at the CLF using Diameter Sh subscribe/notify messages, so that the AP is notified of any changes in the state of the IP address.

If the terminal loses connectivity then the user becomes de-registered in the access network and the allocated IP address may be allocated to another terminal within the access network. The IP address has therefore changed its state. When the IP address changes its state, the CLF sends a message to the AP informing the AP that the IP address is no longer valid for the user.

In response to this message, the AP takes action to terminate all ongoing http sessions related to the user, preventing any data relating to those http sessions from being sent to a terminal that has been subsequently allocated the original IP address. The AP may then decide to log-off the user from the different applications with which the user had ongoing sessions, and furthermore, the AP may deregister the user in the AP as the user is no longer connected. Alternatively, the AP may decide to maintain the authentication status of the user until either:

1. The CLF informs the AP that the IP address has been assigned to a user. In this case the AP checks whether the IP address has been reassigned to a new user or to the original user. This is shown as step a in FIG. 4. If the IP address has been assigned to a new user, then the AP logs-off the original user.

2. An originating http request is received from the same IP address. In this case, the AP checks if the request comes from the original user who remains authenticated in the AP (a user re-authentication may be required). This is shown as step b in FIG. 4. If the user is different, the AP logs-off the original user.

3. A reasonable predetermined period of time has passed and neither of the events 1 or 2 has occurred. Once the predetermined period of time has elapsed, the AP logs-off the original user, as shown in step c of FIG. 4.

When the AP logs off the original user from its records, the AP also cancels the subscription to be notified of changes in the IP Address status at the CLF.

The procedures described above provide a mechanism to prevent unauthorized terminals from receiving IMS communications service related data in the event that the unauthorized terminal is allocated an IP address that was previously allocated to an authorised terminal. It will be appreciated by persons skilled in the art that various modifications may be made to the above described embodiments without departing from the scope of the present invention.

The invention claimed is:

1. A method of terminating an IP Multimedia Subsystem (IMS) network enabled communication service involving a first user terminal, the first terminal having been allocated an IP address by a Connectivity Session Location and Repository Function (CLF) in a fixed line access network used by the first terminal to access the communication service in the IMS network, the method comprising:

upon establishing the IP Multimedia Subsystem enabled communication service, a network node in the IMS network sending a Diameter subscribe message to the CLF in the fixed line access network, the Diameter subscribe message requesting that a Diameter notify message be sent by the CLF to the network node when any change occurs to the state of the allocated IP address;

the network node in the IMS network determining when the IP address is no longer allocated to the user of the first terminal by the fixed line access network as a result of a loss of connectivity between the first user terminal and the fixed line access network, wherein the network node determines non-allocation of the IP address upon receiving the Diameter notify message from the CLF in the fixed line access network signaling a change of state of the IP address; and as a consequence of the determination, the network node terminating all ongoing IMS sessions of the IP Multimedia Subsystem communication service with the first user terminal, thereby de-registering the first user terminal from the IMS network to prevent transmission of any messages related to the first user terminal to a second user terminal in the fixed line access network to which the same IP address has been subsequently reallocated by the CLF.

2. The method according to claim 1, wherein the network node is selected from a Call Session Control Function and an http proxy.

3. The method according to claim 1, wherein the access network uses Network Attachment Sub-System.

4. The method according to claim 1, wherein the IP Multimedia Subsystem enabled communication service is terminated by the network node upon receipt of a message from the CLF in the fixed line access network informing the network node that the IP address has been assigned to another user.

5. The method according to claim 1, wherein the IP Multimedia Subsystem enabled communication service is terminated by the network node upon receipt of a message from a different user having the same IP address.

* * * * *

UNITED STATES PATENT AND TRADEMARK OFFICE
CERTIFICATE OF CORRECTION

| | | |
|---|---|---|
| PATENT NO. | : 8,180,878 B2 | Page 1 of 1 |
| APPLICATION NO. | : 12/518022 | |
| DATED | : May 15, 2012 | |
| INVENTOR(S) | : Lindholm et al. | |

It is certified that error appears in the above-identified patent and that said Letters Patent is hereby corrected as shown below:

On the title page, item (56), under "OTHER PUBLICATIONS", in Column 2, Line 4, delete "tsg sa" and insert -- tsg_sa --, therefor.

In Column 4, Line 10, delete "S-CSCF" and insert -- S-CSCF. --, therefor.

In Column 4, Line 33, delete "AP, AP" and insert -- AP, the AP --, therefor.

Signed and Sealed this
Twenty-third Day of October, 2012

David J. Kappos
*Director of the United States Patent and Trademark Office*